US012623557B2

(12) United States Patent
Flaquiere

(10) Patent No.: US 12,623,557 B2
(45) Date of Patent: May 12, 2026

(54) DEVICE FOR CHARGING THE BATTERIES OF ELECTRIC VEHICLES BY INDUCTION

(71) Applicant: UPANDCHARGE, Issy-les-Moulineaux (FR)

(72) Inventor: Guy Flaquiere, Issy-les-Moulineaux (FR)

(73) Assignee: UPANDCHARGE, Issy-les-Moulineaux (FR)

( * ) Notice: Subject to any disclaimer, the term of this patent is extended or adjusted under 35 U.S.C. 154(b) by 962 days.

(21) Appl. No.: 17/641,508

(22) PCT Filed: Aug. 26, 2020

(86) PCT No.: PCT/FR2020/000228
§ 371 (c)(1),
(2) Date: Mar. 9, 2022

(87) PCT Pub. No.: WO2021/048472
PCT Pub. Date: Mar. 18, 2021

(65) Prior Publication Data
US 2022/0324337 A1     Oct. 13, 2022

(30) Foreign Application Priority Data

Sep. 11, 2019     (FR) ...................................... 1910027

(51) Int. Cl.
*H02J 7/00*          (2026.01)
*B60L 53/12*          (2019.01)
(Continued)

(52) U.S. Cl.
CPC .............. *B60L 53/12* (2019.02); *B60L 53/38* (2019.02); *B60L 53/665* (2019.02); *G06Q 30/04* (2013.01);
(Continued)

(58) Field of Classification Search
CPC ...... B60L 53/12; B60L 53/122; B60L 53/126; B60L 53/14; B60L 53/16; B60L 53/22;
(Continued)

(56) References Cited

U.S. PATENT DOCUMENTS

| 5,821,731 | A | * | 10/1998 | Kuki | ........................ | B60L 53/14 320/108 |
| 2008/0185991 | A1 | * | 8/2008 | Harris | ...................... | B60L 53/16 320/109 |

(Continued)

FOREIGN PATENT DOCUMENTS

| CN | 102917911 A | 2/2013 |
| CN | 105069919 A | 11/2015 |

(Continued)

*Primary Examiner* — Alexis B Pacheco
(74) *Attorney, Agent, or Firm* — 24IP Law Group USA, PLLC; Timothy R DeWitt

(57)     ABSTRACT

The invention relates to a device allowing the charging, without manual intervention, of any type of vehicle by induction with optimum efficiency and allowing invisible integration in any location, even classified sites, since there are no visible points. It consists, for the portion supplying the power, of a power supply cable to the electrical grid (9), of a retractable point (8) including a mechanism for raising and lowering and the primary windings (6), of an electronic box (7), of a receiver (2), of an electronic box (5) integrated beneath the floor pan of the vehicle and either retrofitted or already integrated by the manufacturers, and of a power supply cable (4) connected to the batteries (3). This retractable point (8) will be managed by a mobile application, which is mandatory in or integrated into the vehicle. The device according to the invention is intended in particular to facilitate the charging of electric vehicles by increasing the number of induction charging points, by equipping parking places in rest areas on roads and highways, public or private parking lots, and in parking places in public or private
(Continued)

locations. The device according to the invention is compatible with DC or AC charging. The device according to the invention is also intended to automatically charge, without human intervention, any electric vehicle, any self-driving vehicle including two-wheeled vehicles and robot automatic delivery systems.

20 Claims, 2 Drawing Sheets

(51) Int. Cl.
| | |
|---|---|
| *B60L 53/38* | (2019.01) |
| *B60L 53/66* | (2019.01) |
| *G06Q 30/04* | (2012.01) |
| *H02J 7/14* | (2006.01) |
| *H02J 7/50* | (2026.01) |
| *H02J 7/82* | (2026.01) |
| *H02J 50/10* | (2016.01) |
| *G06Q 50/06* | (2012.01) |

(52) U.S. Cl.
CPC ................. *H02J 7/50* (2026.01); *H02J 7/82* (2026.01); *H02J 50/10* (2016.02); *G06Q 50/06* (2013.01)

(58) Field of Classification Search
CPC .......... B60L 53/30; B60L 53/34; B60L 53/35; B60L 53/36; B60L 53/38
USPC ................................................. 320/132, 134
See application file for complete search history.

(56) References Cited

U.S. PATENT DOCUMENTS

| | | | | |
|---|---|---|---|---|
| 2010/0225271 A1* | 9/2010 | Oyobe | .................... | B60L 50/61 |
| | | | | 320/108 |
| 2012/0280656 A1* | 11/2012 | Bedell | ..................... | B60L 50/53 |
| | | | | 320/109 |
| 2013/0249470 A1* | 9/2013 | Martin | .................... | B60L 53/12 |
| | | | | 320/107 |
| 2014/0062394 A1* | 3/2014 | Khan | ....................... | B60L 53/14 |
| | | | | 320/108 |
| 2015/0095233 A1* | 4/2015 | Wild | ....................... | G06Q 30/04 |
| | | | | 705/44 |
| 2015/0224882 A1* | 8/2015 | Brill | ........................ | H01F 38/14 |
| | | | | 320/108 |
| 2015/0246614 A1* | 9/2015 | Dames | ................. | H05K 9/0075 |
| | | | | 191/10 |
| 2015/0306974 A1* | 10/2015 | Mardall | .............. | H01M 10/625 |
| | | | | 429/120 |
| 2016/0332525 A1* | 11/2016 | Kufner | .................... | B60L 53/36 |
| 2017/0080815 A1* | 3/2017 | Wechsler | ............... | H02J 50/90 |
| 2017/0140349 A1* | 5/2017 | Ricci | ....................... | B60L 53/63 |
| 2017/0327091 A1* | 11/2017 | Capizzo | ................. | B60L 53/68 |
| 2018/0056799 A1* | 3/2018 | Namou | ................... | B60L 58/20 |
| 2020/0324661 A1* | 10/2020 | Freeling-Wilkinson | .................... | |
| | | | | B60L 53/305 |
| 2021/0053456 A1* | 2/2021 | Freeling-Wilkinson | .................... | |
| | | | | B60L 53/18 |

FOREIGN PATENT DOCUMENTS

| | | |
|---|---|---|
| WO | 2011151696 A2 | 12/2011 |
| WO | 2018076016 A1 | 4/2018 |

* cited by examiner

DEVICE FOR CHARGING THE BATTERIES OF ELECTRIC VEHICLES BY INDUCTION

BACKGROUND OF THE INVENTION

Field of the Invention

The present invention relates to a device for facilitating the recharging of electric vehicles by induction, contrary to the current devices using a cable and a connection socket.

Brief Description of the Related Art

The induction recharging solutions proposed for electric vehicles are based on systems with a large distance between the transmitter and the receiver, i.e., about twenty centimeters, which implies the use of expensive high-frequency techniques that have priority for each brand of vehicle. Furthermore, it is also noted that the ground clearance is different depending on the models within the same brand and that the electromagnetic coupling problem is directly proportional to the square of the distance and the centering between the transmitter and the receiver, all of which makes these recharging solutions expensive and difficult to use universally.

SUMMARY OF INVENTION

This original and innovative solution will make it possible to easily recharge the batteries of electric vehicles, automatically, without manual intervention by the driver, and in a near future to recharge the batteries of autonomous vehicles, without human intervention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE INVENTION

Figures 1, 2, 3:
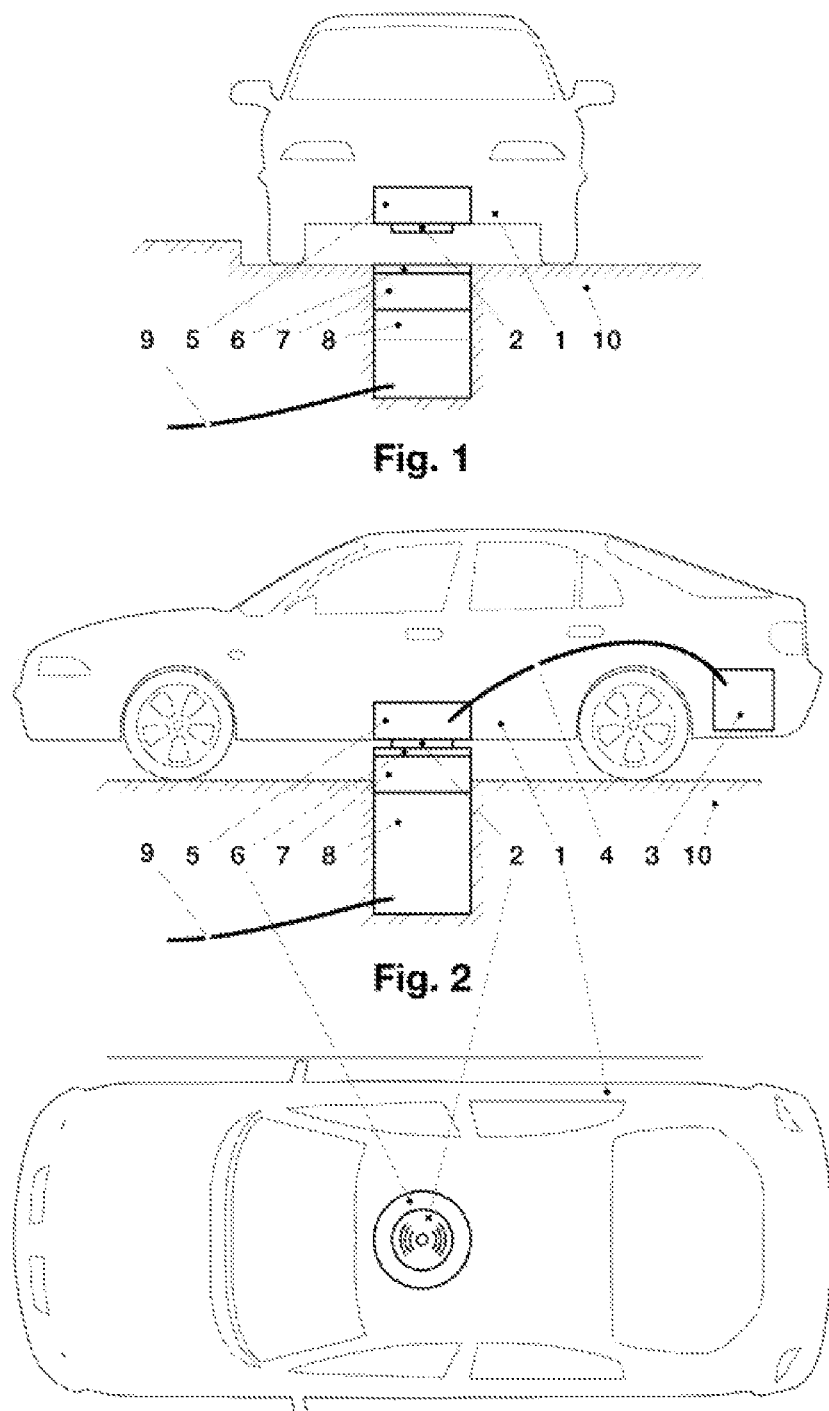
FIG. 1 is a front view of a preferred embodiment of the present invention.
FIG. 2 is a side view of a preferred embodiment of the present invention.
FIG. 3 is a top view of a preferred embodiment of the present invention.
Figure 4:
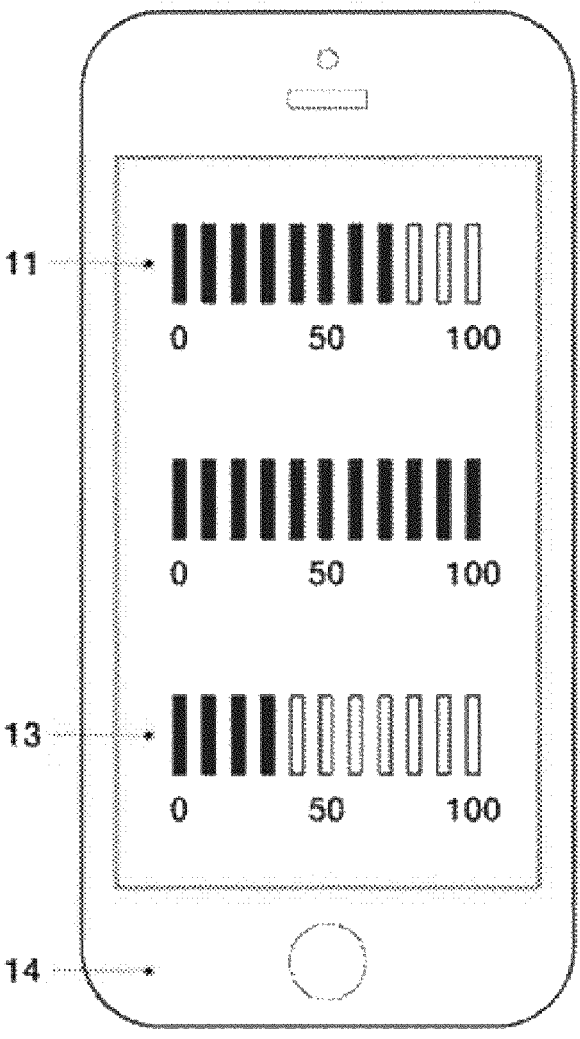
FIG. 4 is a mobile device display in accordance with a preferred embodiment of the present invention.

The present invention consists in using a retractable post (8) comprising the transmitter, which unfolds towards the floor of the electric vehicle (1) (comprising the receiver) to be recharged, until its contact.

This retractable post (8) as well as the floor of the vehicle (1) will be equipped with coils allowing the batteries (3) to be recharged by induction using a universal process chosen by all vehicle manufacturers. The retractable post (8) will be equipped with control electronics (7) allowing the transmitter to be brought up to the receiver (2) and with safety devices. This will allow the electrical energy to be transmitted to the batteries of the vehicle via an electronic box (5) and the power cable (4). The transmitter coils (6) are integrated at the top of the retractable post (8).

This post (8) also includes a mechanical device for raising and lowering the post, as well as a power cable (9) delivering energy from the electrical network.

The charging mode can be carried out in direct or alternating current through the electronic box allowing the choice of the battery charging speed.

This solution allows to guarantee an optimum efficiency of the batteries recharging by induction.

This solution has the advantage of proposing a universal system compatible with all vehicle ground clearances and thus maximizing the electrical efficiency to over 95%. The receiver coil will be located in the middle of the vehicle floor, thus facilitating the centering of the receiver and the transmitter. This alignment will be controllable via an application (14) that will be integrated into the cell phones or directly included in the vehicle interface when the post is in the rest position.

This application (14) will make it possible to locate the available posts, to allow the centering of the vehicle that can be parked in a parking space in forward or reverse, or on the right or left along a sidewalk (the receiver being already centered on the transmitter in transverse).

The application (14) will also make it possible to control the charge level (13) and the charge time (11), to manage the control of the height of the post according to the vehicle until the contact and to prohibit the starting of the vehicle if the post is not returned to its starting point, i.e., to the zero level with respect to the ground.

The application (14) will also manage the data allowing the invoicing of the charging according to the requested power and the duration of the charging, will integrate the banking information of the user and will integrate a map indicating the available charging stations near the vehicle.

The automation of this post (8) will be secured at several levels: the post will only be able to deploy if the centering indicates a correct coupling, the recharging will only be able to start if the post (transmitter part with an integrated coil) is in contact with the receiver part (integrated coil under the vehicle floor), and the vehicle (1) will only be able to move if the post has completely returned to its initial position, i.e. at ground level.

This solution will allow to install these charging posts easily in all public or private places as well as in classified places, because they will be invisible and impossible to vandalize because no element will be apparent on the surface of the road.

The annexed drawings illustrate the simplicity of the solution and its obvious efficiency.

Integral automation, invisible at rest, adaptable to all types of rechargeable electric vehicles: cars, trucks, coaches, autonomous vehicles, as well as two-wheelers, scooters, motorcycles, autonomous systems (delivery robots), etc.

The invention claimed is:

1. A system for recharging batteries of an electric vehicle by induction, comprising:

a retractable post configured to be located in a roadway; and an application, wherein said application is a mobile application or an application configured to be included in the electric vehicle;

wherein the post comprises:

a transmitter including at least one coil allowing transmission of electric energy by induction to a receiver integrated under a floor of the electric vehicle thereby allowing recharging the batteries of the electric vehicle through an electronic box and a power supply cable of the electric vehicle;

a mechanical device configured to raise and to lower the post; and control electronics configured to bring the transmitter up from a zero level to the receiver integrated under the floor of the electric vehicle floor and return the post to said zero level with respect to the ground; and wherein the application is configured:

to control a position of the electric vehicle with respect to the post in a rest position;

to manage control of a displacement in height of the post with respect to the electric vehicle until contact with the receiver; and to prohibit a starting of the electric vehicle if the post has not returned to the zero level.

2. The system according to claim 1, wherein the post comprises a power cable allowing to deliver electric energy from an electrical network.

3. The system according to claim 1, wherein the application is also arranged to indicate a coupling quality, a level of charge and a charging time.

4. The system according to claim 1, wherein the coil(s) is/are integrated at a top of the post.

5. The system according to claim 1, wherein a charging mode can be carried out in direct current or in alternating current by means of the electronic box of the electric vehicle that allows to choose a speed of recharging the batteries.

6. The system according to claim 1, wherein the post further includes safety devices included in an electronic box containing the control electronics.

7. The system according to claim 1, wherein the application is arranged to integrate user banking information and to allow an invoicing of electric energy consumed.

8. The system according to claim 1, wherein the application integrates a map indicating posts available in a vicinity of the electric vehicle.

9. The system according to claim 2, wherein the application:

is necessary and indispensable for using the post;

is arranged to indicate a coupling quality, a level of charge and a charging time;

is arranged to integrate user banking information and to allow an invoicing of the electric energy consumed; and integrates a map indicating posts available in a vicinity of the electric vehicle.

10. The system according to claim 1, wherein the retractable post is located in a roadway.

11. A mobile application for a system for recharging batteries of an electric vehicle by induction, the system comprising a retractable post located in a roadway, the retractable post comprising:

a transmitter including coil(s) allowing to transmit electric energy by induction to a receiver integrated under a floor of the electric vehicle thereby allowing to recharge the batteries of the electric vehicle through an electronic box and a power supply cable of the electric vehicle;

a mechanical device allowing to raise and to lower the post, and control electronics allowing to bring the transmitter up to the receiver integrated under the floor of the electric vehicle floor and return the transmitter to a zero level with respect to the roadway; and wherein the application is arranged:

to control a position of the electric vehicle with respect to the post with the post at a zero level with respect to the roadway;

to manage a control of a displacement in height of the post with respect to the electric vehicle until contact with the receiver; and to prohibit a starting of the electric vehicle if the post has not returned to a zero level with respect to the roadway.

12. The mobile application according to claim 11, which is arranged to indicate a coupling quality, a level of charge and a charging time.

13. The mobile application according to claim 11, which is arranged to integrate user banking information and to allow an invoicing of electric energy consumed.

14. The mobile application according to claim 11, wherein the application integrates a map indicating posts available in a vicinity of the electric vehicle.

15. The mobile application according to claim 11, wherein the application:

is necessary and indispensable for using the post;

is arranged to indicate a coupling quality, a level of charge and a charging time;

is arranged to integrate user banking information and is arranged to allow an invoicing of the electric energy consumed; and integrates a map indicating posts available in a vicinity of the electric vehicle.

16. An application included in an electric vehicle which application is for a system for recharging batteries of the electric vehicle by induction, the system comprising a retractable post located in a roadway, the post comprising:

a transmitter including coil(s) allowing to transmit electric energy by induction to a receiver integrated under a floor of the electric vehicle thereby allowing to recharge the batteries of the electric vehicle through an electronic box and a power supply cable of the electric vehicle;

a mechanical device allowing to raise and to lower the post; and control electronics allowing to bring the transmitter up to the receiver integrated under the floor of the electric vehicle floor; and wherein the application is arranged:

to control a position of the electric vehicle with respect to the post in a rest position;

to manage a control of a displacement in height of the post with respect to the electric vehicle until contact with the receiver; and to prohibit a starting of the electric vehicle if the post has not returned to the rest position.

17. The application according to claim 16, wherein the application is arranged to indicate a coupling quality, a level of charge and a charging time.

18. The application according to claim 16, wherein the application is arranged to integrate user banking information and to allow an invoicing of electric energy consumed.

19. The application according to claim 16, wherein the application integrates a map indicating posts available in a vicinity of the electric vehicle.

20. The system according to claim 17, wherein the application:

is necessary and indispensable for using the post;

is arranged to indicate a coupling quality, a level of charge and a charging time;

is arranged to integrate user banking information and to allow an invoicing of the electric energy consumed; and integrates a map indicating posts available in a vicinity of
the electric vehicle.

* * * * *